United States Patent [19]

[11] 3,925,621

[45] Dec. 9, 1975

Collins et al.

[54] DIGITAL CIRCUIT SWITCHED TIME-SPACE-TIME SWITCH EQUIPPED TIME DIVISION TRANSMISSION LOOP SYSTEM

[75] Inventors: Arthur A. Collins, Dallas; Robert D. Pedersen, Richardson, both of Tex.

[73] Assignee: Arthur A. Collins, Inc., Dallas, Tex.

[22] Filed: Jan. 17, 1974

[21] Appl. No.: 434,198

[52] U.S. Cl. .......... 179/15 AL
[51] Int. Cl.$^2$ .......... H04J 3/06
[58] Field of Search.... 340/172.5; 179/15 A, 15 AL

[56] References Cited

UNITED STATES PATENTS

| | | | |
|---|---|---|---|
| 3,749,845 | 7/1973 | Fraser | 179/15 AL |
| 3,796,835 | 3/1974 | Closs | 179/15 AL |
| 3,810,100 | 5/1974 | Hungerford | 340/172.5 |
| 3,846,587 | 11/1974 | Schenkel | 179/15 AL |

*Primary Examiner*—Ralph D. Blakeslee
*Attorney, Agent, or Firm*—Warren H. Kintzinger

[57] ABSTRACT

This is a TST (Time-Space-Time) digital switching node equipped distributed loop switching telecommunications system with a loop build-out buffer connected in parallel with one switching node in each communication loop of the system. This allows data received at the switch node to be routed through the switch, or to the loop build-out buffer. It requires that the TST inlet data store write address be indexed with respect to the outlet data store read address by an amount equal to message delay through the loop build-out buffer. The system allows by-passing of individual switching nodes by the data not to be routed by that switching node and a reduction in switching load with calls placeable between any two specific switching nodes in a loop by-passing all others in the loop. The loop system utilizes a plurality of time division multiplexed channels for transferring information between TST switching nodes. Series-connected line terminating units are used, in effect, as a circulating end around shift register including storage elements comprised of the internal storage delays of the individual line terminating units and of the propagation delay of the transmission medium, including build-out memory. Hard-wired logic is used in achieving high-speed control in loop switching functions and to reduce loading and critical reliance on connected TST switches and their associated call processors. A multiplicity of loops are interconnected by TST switches that effectively interface communication loops in an expanded network wherein one timing source controls timing of the whole system.

17 Claims, 7 Drawing Figures

Figure 1:
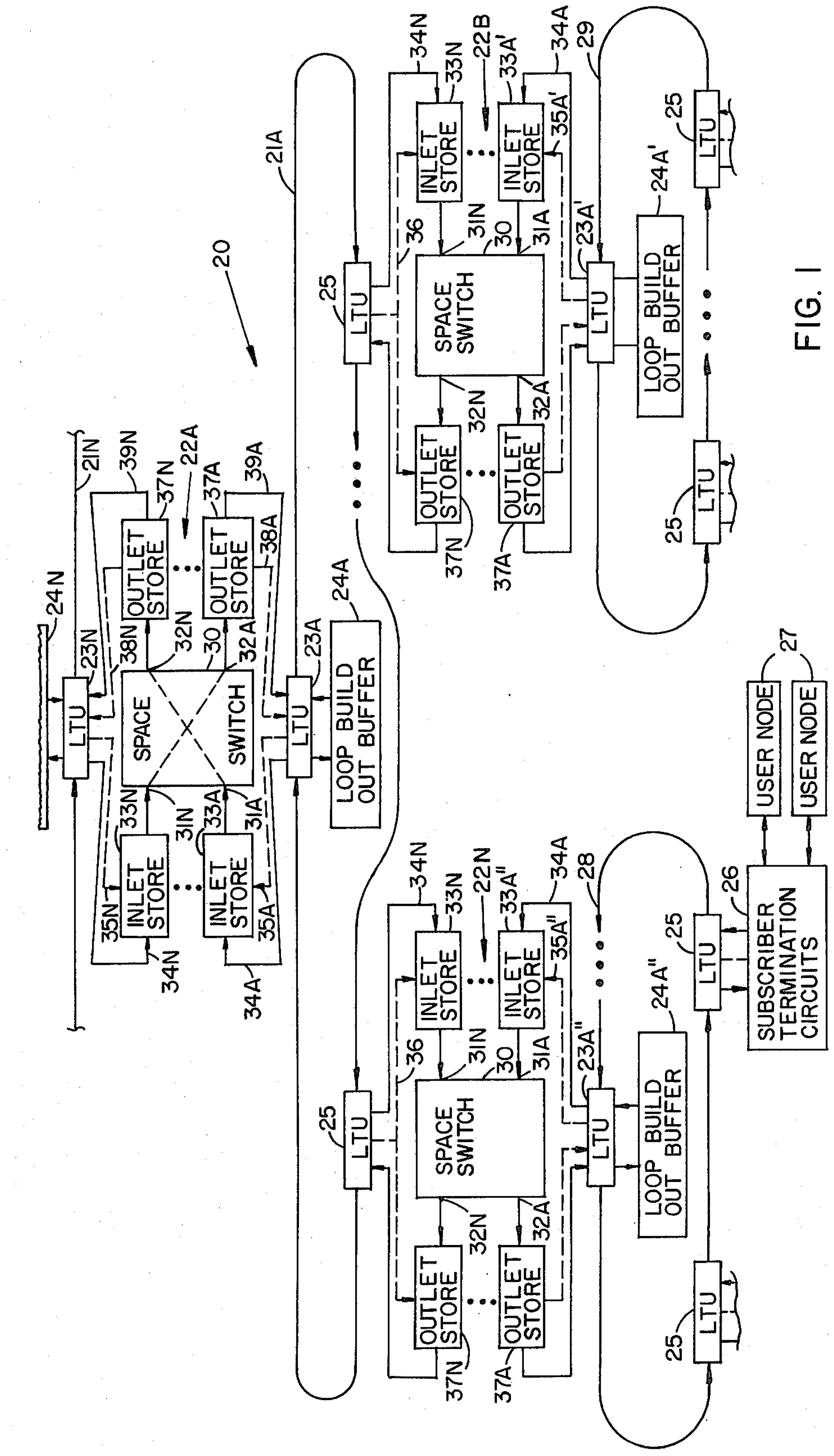

DIGITAL CIRCUIT SWITCHED TIME-SPACE-TIME SWITCH EQUIPPED TIME DIVISION TRANSMISSION LOOP SYSTEM

This invention relates in general to loop telecommunications systems, and in particular, to the interconnection of TST (Time-Space-Time) digital switching nodes in a distributed loop switching system having a loop build-out buffer connected in parallel with one digital switching node. It is a loop system using *c* (*c* plurality) time division multiplexed communication channels for transferring information between the TST switching nodes with the multiplexing and switching functions integrated into common equipment and any need for separate multiplex systems removed. It is a circuit switched, digital network with user terminal-to-terminal connections established through TST switching nodes and loop sections prior to commencing communications.

Time division transmission techniques are becoming progressively of greater interest for use in various ways for telecommunication networks, although, still today, almost all systems use analog switching methods requiring a conversion of digital signals to analog form for switching, and then reconversion to digital form for multiplexing and transmission. This has, in many instances, given rise to requirements for separate digital multiplexing equipment with digital multiplex hierarchies being implemented in much the same fashion that frequency division multiplex (FDM) hierarchies are implemented. The combining of several digital signal streams from different sources for transmission over a common multiplexed link has also given rise to timing adjustment problems at the point of combining. In reality, digital multiplexing equipment is very close in structure to that required for digital switching. This being the case, it follows that when digital switching is used in a network, it is quite appropriate to re-examine the traditional relationships between multiplexing equipment and switching equipment, and achieve an integration into common equipment.

It is therefore a principal object of this invention to provide a looped telecommunications system having a multiplicity of switching nodes on a single loop with digital signal multiplexing in digital switch nodes and a loop build-out buffer connected in parallel with one switching node allowing data received at that node to be routed through the switch or to the loop build-out buffer.

Another object is to provide in such a looped telecommunications system, the capability of placing calls between any specific two switching nodes of a single loop without involving any other nodes of the single loop and thereby reduce switching load through such by-passing on non-involved individual switching nodes.

A further object is to achieve distribution of a common clock to all loopconnected switching nodes, and for clock recovery at each receiving switch node from the received loop signal, and thereby eliminate any requirement for a separate timing distribution network.

Still a further object is to eliminate any requirement for pulse stuffing arising from the use of different clocks.

Another object is to allow increase in the number of switching nodes connected to a loop, up to matching the loop capacity, via distributed access to the loop.

Features of this invention useful in accomplishing the above objects, include, in a digital circuit switched TST switch equipped time division transmission loop system, interconnected TST switching nodes in a loop switching system. A loop build-out buffer is provided with each loop in the system, connected in parallel with one switching node, allowing data received at that node to be routed through the switch, or to the loop build-out buffer. Each TST inlet includes a data store write address indexed with respect to an outlet data store read address by an amount corresponding to delay introduced by that loop's build-out buffer. It is a time division loop telecommunications system allowing the by-passing of individual switching nodes with data not to be routed by those switching nodes, with a resultant material reduction in switching loads imposed on system loop network nodes. This involves connections being made between two switching nodes being set up and taken down, using distributed loop control logic without involving other switching nodes, and thereby, a great reduction in call processing load on switching nodes, by involving only the nodes being connected. Distributed access to loop switching in the system allows the number of switching nodes connected to a loop to be increased to a limit matching total loop capacity. Loop timing of each loop is derived from the switch with the loop build-out buffer in the respective loop, and all other switching nodes of that loop derive timing from the received circulating loop signal frame with no separate timing network required and with all switches freely interconnectable through sharing a common clock. The digital network loop system employs circuit switching in establishing user terminal-to-terminal connections that are held for the duration of the call-resulting in the networks being usable for both voice and data traffic. Voice traffic requires conversion to a digital form suitable for transmission in the digital networks such as may be accomplished by standard PCM or delta modulation techniques. Operation of such a circuit switching network requires careful and accurate distribution of timing signals because switching nodes and connected transmission links must operate in a synchronous fashion (a requirement not imposed on store-and-forward or packet-switched networks.

A specific embodiment representing what is presently regarded as the best mode of carrying out the invention is illustrated in the accompanying drawings.

Figure 2:
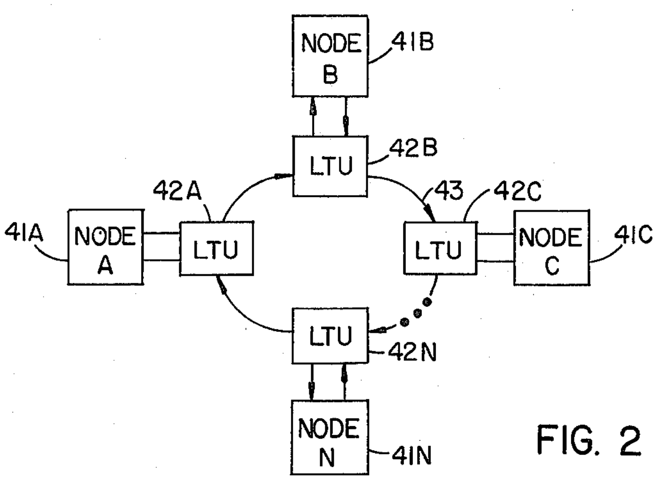
Figure 3:
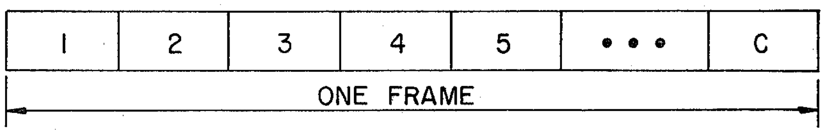
Figure 5:
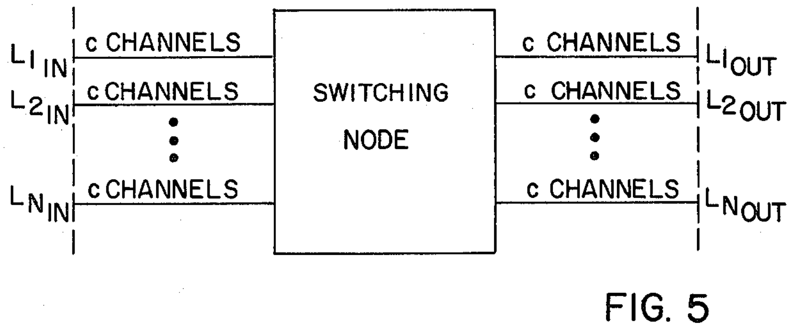
Figure 6:
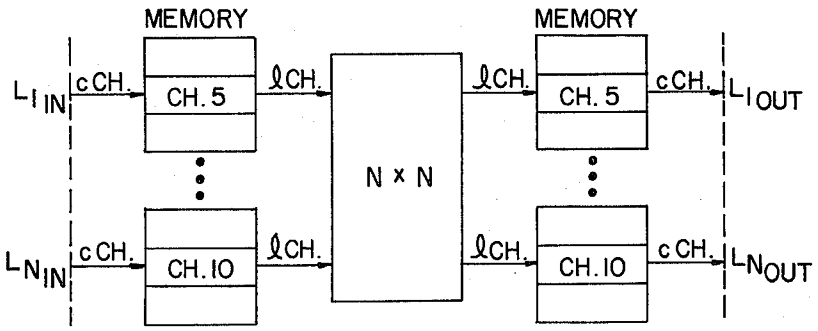
Figure 4:
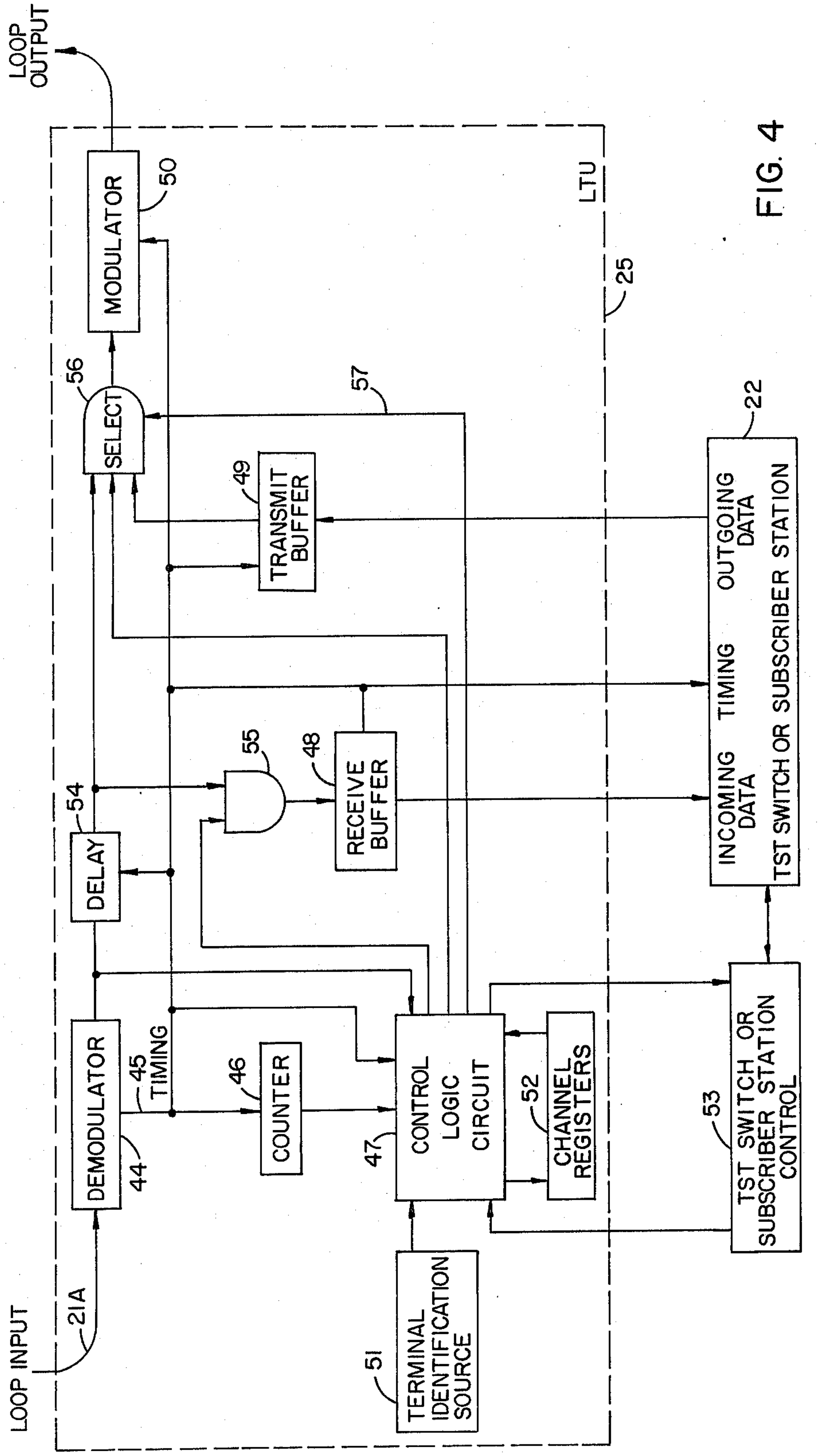
Figure 7:
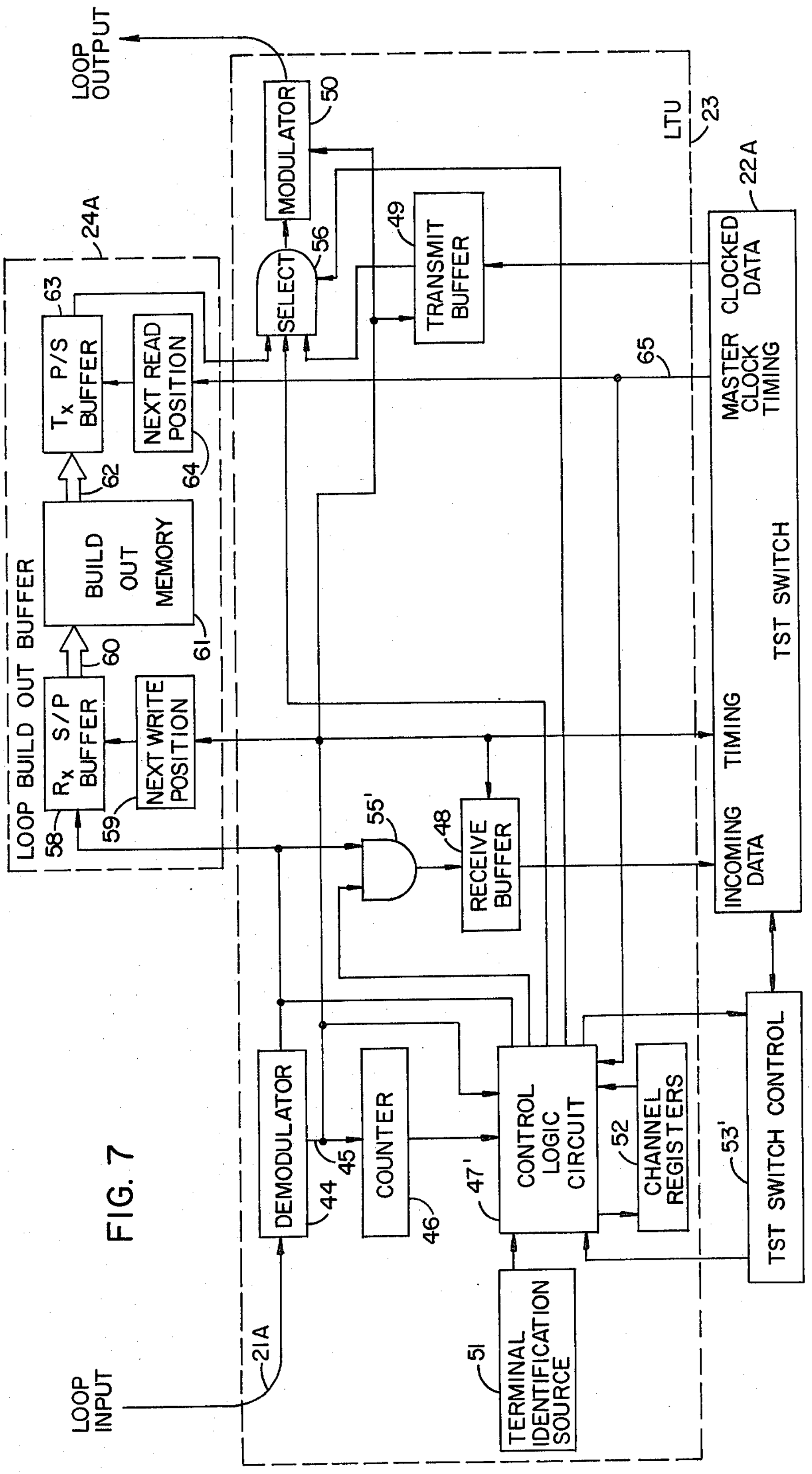

In the drawings:

FIG. 1 represents a block schematic diagram of a TST switch equipped time division transmission loop system;

FIG. 2, a block message flow schematic of a basic time division transmission loop switching system;

FIG. 3, a simplified showing of the basic frame format with time on the loop divided into c channels;

FIG. 4, a block schematic diagram of a (LTU) loop termination unit;

FIG. 5, a general switching situation;

FIG. 6, a generalized Time-Space-Time (TST) switch; and,

FIG. 7, a block schematic diagram of a loop termination unit (LTU) quite similar to the LTU showing of FIG. 4, with, however, a loop build-out buffer added.

Referring to the drawings:

The digital circuit switched time-space-time (TST) switch equipped time division transmission loop system 20 of FIG. 1 is shown to have a base time division transmission loop 21A with a plurality of TST switching units 22A, 22B . . . 22N interfaced therewith. A loop terminal unit (LTU) 23A connected to loop build-out buffer 24A provides the interface with loop 21A for TST switching unit 22A. Additional loop terminal units 25 provide interfaces with loop 21A for TST switching units 22B . . . 22N, and for interface of additional TST switching units and subscriber termination circuit 26, having a plurality of user nodes 27, with sub loop 28, and as could exist with sub loop 29. These are typical of a great multiplicity of sub loops connected through TST switching units 22A and 22B . . . 22N, and even extending down to further sub loops interfaced with intervening sub loops in a major time division transmission loop system 20. Loop termination units 23A' and 23A'', quite like LTU 23A, connected to loop build-out buffers 24A' and 24A'' provide the interfaces with sub loops 28 and 29, just as does LTU 23A with loop build-out buffer 24A provide TST switch 22A interface with loop 21A. The time-space-time (TST) switches 22A and 22B . . . 22N are each shown to have a center space switch section 30 wherein a plurality of input terminal connections 31A . . . 31N may be cross-connected to a plurality of output terminal connections 32A . . . 32N. A plurality of memory inlet store units 33A . . . 33N, having a corresponding plurality of channel inputs 34A . . . 34N from LTU 23 and LTU 25 units of respective time division transmission loops such as base loop 21A, and loops 28 and 29, are connected, respectively, to the plurality of input terminal connections 31A . . . 31N of respective TST switches 22A and 22B . . . 22N. A timing signal line 35A . . . 35N is also connected from the loops 21A. . . 21N through the respective LTU units 23A . . . 23N only to memory inlet store units 33A . . . 33N, and from sub loops 28 and 29, timing signal lines 35A'' and 35A' are connected through the respective LTU units 23A'' and 23A' only to memory inlet store units 33A'' and 33A', while a timing signal line 36 is connected from respective loops, through the respective LTU units 25, to both memory inlet store units 33N, and to memory outlet store units 37N of TST switches 22B . . . 22N. Memory outlet store units 37A . . . 37N are connected, respectively, to the plurality of output terminal connections 32A . . . 32N of respective space switches 30. The TST switching unit 22A is equipped with a timing clock to thereby provide clock timing through timing signal lines 38A . . . 38N, from memory outlet stores 37A . . . 37N, and through respective LTU units 23A . . . 23N to respective loops 21A . . . 21N. The channel output lines 39A . . . 39N of outlet stores 37A . . . 37N are connected to respective time division transmission loops 21A . . . 21N, all of which are originating loops with TST switch 22A, via LTU units 23A . . . 23N, respectively. With all TST switches such as 22B . . . 22N, and others, like TST switches on other loops than loop 21A—other than TST switch 22A, having a master clock source—one loop interfaced with each respective TST switch is not an originating loop of that switch.

With this invention including such interconnecting of TST switching nodes in a loop switching system, it is important that basic operation of the loop system with the TST switching nodes be well understood. In a basic loop switching system 40, such as shown in FIG. 2, N switch nodes 41A, 41B, 41C . . . 41N are interconnected via loop terminal units 42A, 42B, 42C . . . 42N, through aa serial time division transmission loop 43. Time on the loop is divided into c channels, in accord with the one-frame format of FIG. 3, with one or more of the channels used for synchronization and control. A synchronization code is transmitted to enable modulo-c counters at each LTU to identify the individual channels. The total time for the appearance of c channels is called one frame. A connection between two nodes of the loop switching system of FIG. 1 is established using one of the c-channels. The time for the $i^{th}$ channel in a particular fram is called the $i^{th}$ time slot. If a node is communicating on a particular channel, information received on the corresponding time slot is removed from the loop and replaced on the transmit side of the node with information for the node with which it is communicating. Channels not being used by a particular node are by-passed and allowed to circulate on the loop. Thus, it is seen that a full duplex connection can be made between two connected nodes using a single communication channel.

In general, loop terminal units (LTU's) must provide the following functions:

1. Demodulate the received carrier.
2. Detect the loop synchronization code and provide channel identification, using a modulo-*c* counter.
3. Provide an address register(s) to store the channel number(s) of channels currently being used for communication by the connected node.
4. Allow by-passing of channels not being used by the connected terminal.
5. Have address decode logic to recognize incoming call requests addressed to the connected node.
6. Provide 1/0 registers for transfer of data on and off of the loop.
7. Have appropriate logic to allow setting up and taking down of calls in accordance with the defined loop control algorithms.
8. Modulate the transmitted carrier with outgoing data.

With a LTU configured as shown in FIG. 4, and used as LTU's 25 in the loop system 20 of FIG. 1, the input demodulator 44 not only detects individual data bits, but also from the data stream, provides clock and frame synchronization pulses on timing line 45. The timing information on line 45 is applied to counter 46, having an output connection to control logic circut 47, also having an input from timing line 45. Timing line 45 is also input connected to receive buffer 48, transmit buffer 49, modulator 50, and to the TST switch 22 (or 41). Individual channels are identified by counts of counter 46, applied to control logic circuit 47. Control logic circuit 47 also receives, in addition to the timing input connection from timing line 45, inputs from terminal identification source 51, the loop signal out of demodulator 44, and channel registers circuit 52, that receives an input from control logic circuit 47. The control logic circuit 47 also receives an input from, and supplies an output to TST switch or subscriber station control 53, that also has back and forth interconnect with TST switch or subscriber station 22. The control logic circuit 47 performs the necessary control functions for setting up and taking down loop calls and monitors incoming loop signals as well. Control signals from the control section 53 of the connected node are used, via the control logic circuit 47, to request connections, and also to notify the connected node of arriving calls. The channel registers 52 are used to store the channel numbers of all loop channels being used by this particular LTU 25. The address of this particular LTU is supplied from terminal identification source that can be in the form of a strapping option.

A signal series delay device 54, positioned in the loop 21A path after demodulator 44 in each LTU 25, also receives a timing input from timing line 45. While it is generally desirable to minimize the series delay introduced by a LTU, in practice, the demodulation process, operation of the by-pass logic, and modulation of information to be transmitted on the outgoing loop, will introduce a minimum of 2 to 3 bits of delay. The delay provided by the delay device 54 is for decision time, should the LTU control logic circuit 47 need to observe incoming data before routing the data. The received data is then gated through AND gate 55, as controlled by a gating output from the control logic circuit 47, through receive buffer 48, also having a timing input connection from timing line 45, and on, as incoming data to the TST switch or subscriber station 22. Outgoing data to be transmitted is passed through transmit buffer circuit 49, also having a timing input connection from timing line 45, as an input to three-signal input select gate 56. Select gate 56 selects the output signal being passed through modulator circuit 50, and on out in the loop, from three sources. Data circulating in the loop, that is to continue circulation, is gated through select gate 56, from the top input connected to the loop path output of delay device 54. Control information that is to be injected into the loop data stream is fed from the control logic circuit 47 to the middle input of select gate 56, controlled through additional gating control connection line 57, from control logic circuit 47. In the data replacement mode, node-received information is replaced with output from the transmit buffer at the lower input terminal of the select gate 56. The three inputs are subject to gated control through selector gate 56, under control of the LTU control logic circuit 47, with the gated output routed through the modulator for transmission on through the loop 21A.

Referring again to the basic loop switching system of FIG. 2, please consider the operation of a c channel system with N LTU's. With each LTU in a loop introducing $k$ bits of delay in the loop transmission path, the total delay around the loop will be $kN + T_p$, where $T_p$ is the loop propagation delay. Considering the transmit port of a given LTU, and that the $i^{th}$ channel of a frame has just been transmitted from the terminal, that channel cannot be transmitted again for one complete frame time. The $i^{th}$ channel simply cannot arrive at that output port until it is again time to transmit it. This condition is met if the total loop delay, $kN + T_p$, is exactly equal to one frame time, and also if $kN + T_p$ is equal to an integral number of frame times. In this latter case, more than one appearance of each channel will simultaneously be circulating on the loop. As a practical matter, in a general purpose loop switching system, it is necessary to provide a loop build-out, such as accomplished with loop build-out buffers 24A . . . 24N, 24A' and 24A'' in the TST switch equipped time division transmission loop system 20 of FIG. 1, to achieve the required loop delays equal to, in each loop instance, an integral number of frames. This build-out can be implemented using an elastic store, storing the incoming data, and transmitting it at the appropriate time, with the build-out automatically adjusting for variations in delay—as described in greater detail hereinafter.

FIG. 5 is illustrative of the general switching situation encountered in a time division switching network with the basic switching node having N bi-directional ports, each with c time division channels, and the basic frame format for each port as shown in FIG. 3. The most general switching porblem is to transfer information from one channel of an inlet link to another channel, on a different outlet link, with it being obvious that such switching involve both time and space translations. Time translation is accomplished using memories in the switch node that delay input samples until the appropriate output channel time. This concept is incorporated in a particularly useful switch structure, as indicated in FIG. 6, and referred to as a Time-Space-Time, or TST, switch. In this switch, each inlet link and each outlet link are terminated with individual memories, with each containing enough storage to accommodate one frame of data. Input words are written sequentially into the inlet memory, and read sequentially from the outlet memories. Switching between memories is accomplished via the space division switch that may be a single- or multiple-stage switch. Links of the space division switch are also time division multiplexed with $l$ time-division channels per frame. A particular one of these $l$ channels is assigned to each direction of a call established through the switch, and any one of the $l$ channels can be used to transfer a data word from any inlet memory location to any outlet memory location. Selection of the channels to be used for a particular call is determined when the path is originally set up. In the FIG. 6 example, information stored in location 5 of the inlet memory for $L_{1_{IN}}$ is transferred to location 10 of the outlet memory for $L_{N_{OUT}}$, and, in like manner, channel 10 is transferred from $L_{N_{IN}}$ to location 5 of the output memory for $L_{1_{OUT}}$.

Total loop delay in loop systems such as shown in FIG. 1, including delay encountered in series taps and propagation delay must be built out to an integral number of loop frame times and it is important that this be accomplished in a loop system operating with TST switches. TST switching units are connected to loops in the system through loop terminating units (LTU's), and one LTU with each loop in the system as a build-out buffer associated with it. Data arriving on a loop at the LTU with a buffer, is routed to the inlet data store if it is to be switched off this particular loop through the TST switch also associated therewith. The data destined to continue circulating on through in the loop, is written into the loop build-out buffer and, on the output side, successive data words are read from the loop build-out buffer, or from the outlet data store of the TST switch.

The amount of information stored in the loop build-out buffer is just sufficient to achieve the required total loop delay. It also follows that the inlet data store write counter must be indexed relative to the outlet data store read counter. For example, if $k$ words are stored in the loop build-out buffer, the inlet store write address counter will be displaced k words from the outlet data store read address counter. All outlet data stores are read in synchronism with the switch clock. This sync must be provided to the LTU, to enable proper addressing of the loop build-out buffer. The inlet data store write address must be supplied from the LTU. Note that, in general, the offset between the inlet and outlet store addresses will be different for every loop connected to the switch with an associated loop build-out buffer.

Build-out buffers are required at only one TST switch in each operational time division loop, with the LTU's associated therewith operating somewhat differently than with the other LTU's previously described, and hown in FIG. 4, with those LTU's having minimal de-ıy. In those cases, the LTU's need only supply loop rame sync to the switch. The connection of loop build-ut buffer, such as 24A, to a LTU such as LTU 23A, in 'IG. 1, is illustrated in much greater detail in FIG. 7, a igure generally identical to the LTU showing of FIG. 4, xcept for the routing through the loop build-out buffer nd the connections therefor. With the showing of FIG. , components the same as with the LTU showing of 'IG. 4, are numbered the same, as a matter of conveni-nce-and, in some instances, portions of description ap-licable to both are not repeated again. Further, some ircuit sections, similar, are given primed identification umbers, as a matter of convenience; with, for exam-le, gate 55' having an input directly from the output of emodulator 44, and delay unit 54 removed, with loop uild-out buffer 24A added. The loop output of de-nodulator 44 is connected as an input of the loop uild-out buffer series to parallel receive buffer section 8, also receiving a next write position circuit 59 timing nput from timing line 45. The data in parallel output 0, from buffer section 58, is transferred to build-out nemory 61, and then in parallel output 62, from mem-ry 61, to parallel-to-series transmit buffer 63, using he next read position 64 derived from a master clock iming line 65. The master clock timing line 65 is also connected as an input to control logic circuit 47', in roviding a master clock input to the whole time divi-ion looped telecommunications system, from which all iming is ultimately derived, with the resulting time de-ays to the various system locations. Timing for the TST witches 22B . . . 22N is derived from the incoming sig-ıal of loop 21A. Such derived timing is subsequently ısed for all sub loops originating at the respective TST witches 22B . . . 22N. Further timing for successively ower loops is derived in like manner and used through espective TST as next read position 64 inputs to re-pective buffers 63. Thus, in whichever form, build-out uffers are provided with both the received loop frame ync and the switch output store sync signals, as the lata write and read addresses needed for the build-out uffer.

To reiterate, both the master clock timed build-out uffers 24A . . . 24N, used with master loops 21A . . . 21N, and the non-master clock timed build-out buffers uch as 23A' and 23A'' used with sub-loops 28 and 29, ıll have a receive buffer used to store incoming bits and erform serial to parallel conversion. Data from the re-eive buffer is stored in the build-out memory, with re-eive from sync provided to indicate the next write po-ition (NWP) for the build-out memory. A transmit uffer on the output side provides parallel to serial con-ersion and allows the data bits to be clocked out in ync with timing from the TST output switch clock (in the master clock location), and by loop signal frame derived timing with LTU's having build-out buffers in sub-loops. Then next read position indicates the next build-out memory location to be read.

Thus a circuit switched digital network is provided wherein a physical circuit, in time and space-through time-space-time digital switching nodes and loop sec-tions, as a time division network- is dedicated to a call before commencing the call, for the duration of the call, with respect to all calls placed through the system. It should be noted that this operation is distinguished from store and forward or packet switched operation wherein such user terminal-to-terminal circuits are not dedicated for the duration of the call.

Whereas this invention is herein illustrated and described primarily with respect to a single system embodiment hereof, it should be realized that various changes may be made without departing from essential contributions to the art made by the teachings hereof.

We claim:

1. In a loop digital telecommunications system: interconnection of time-space-time digital switching node means in a distributed loop switching system; a plurality of time division transmission loops interconnected by said time-space-time digital switching node means wherein user terminal-to-terminal connections are established through interconnected time-space-time switching nodes and connected loops in the circuit prior to commencing communication; a loop build-out buffer in each of said plurality of time division transmission loops; and timing means connected through said time-space-time digital switching node means to each of said build-out buffers.

2. The loop digital telecommunications system of claim 1, wherein a plurality of time-space-time digital switching devices, as said time-space-time digital switching node means, are connected to a common loop of said plurality of time division transmission loops.

3. The loop digital telecommunications system of claim 2, wherein one of said build-out buffers is connected to one of said time-space-time digital switching devices in each loop of said plurality of time division loops.

4. The loop digital telecommunications system of claim 2, wherein said timing means includes a common timing source for the distributed loop switching system.

5. In a loop digital telecommunications system: interconnection of time-space-time digital switching node means in a distributed loop switching system; a plurality of time division transmission loops interconnected by said time-space-time digital switching node means; a loop build-out buffer in each of said plurality of time division transmission loops; timing means connected through said time-space-time digital switching node means to each of said build-out buffers; a plurality of time-space-time digital switching devices, as said time-space-time digital switching node means, are connected to a common loop of said plurality of time division transmission loops; wherein each of time-space-time digital switching devices has a plurality of inlets and a plurality of outlets; and includes at each inlet, of said plurality of inlets, a data store write address, and at each outlet, of said plurality of outlets, a data read address; and indexing means indexing each data store write address with respect to an outlet data store read address by an amount equal to delay introduced by the respective loop build-out buffer.

6. The loop digital telecommunications system of claim 2, wherein one of said build-out buffers is connected to a time-space-time digital switching device that is a timing control input source for each respective loop of said plurality of loops.

7. In a loop digital telecommunications system: interconnection of time-space-time digital switching node means in a distributed loop switching system; a plurality of time division transmission loops interconnected by said time-space-time digital switching node means, a loop build-out buffer in each of said plurality of time division transmission loops; timing means connected through said time-space-time digital switching node means to each of said build-out buffers; a plurality of time-space-time digital switching devices, as said time-space-time digital switching node means, are connected to a common loop of said plurality of time division transmission loops; wherein one of said build-out buffers is connected to a time-space-time digital switching device that is a timing control input source for each respective loop of said plurality of loops; total loop delay in each loop of the system including delay encountered in switch series taps and propagation delay is built to an integral number of loop frame times including time through the buffer of each loop, and also with buffer time equal to time of stepping channels into and out of the time-space-time digital switching device connected to a build-out buffer in each loop.

8. In a digital circuit switched time-space-time equipped time division transmission loop system: a plurality of loops; a plurality of time-space-time switches; a single timing source; interconnection of said plurality of loops by said plurality of time-space time switches in interfacing the loops as communication loops, with user terminal-to-terminal connections established prior to commencing communications, in an expanded network wherein said single timing source controls timing of the whole system.

9. The loop system of claim 8, wherein said plurality of loops includes, a plurality of primary loops, and a plurality of sub loops; said plurality of time-space-time switches includes, a single master time control time-space-time switch equipped with said single timing source, and a plurality of secondary time-space-time switches connected to said master time control time-space-time switch through transmission media means of said plurality of loops; said plurality of primary loops are directly connected to said single master time control time-space-time switch; and said plurality of sub loops are connected through intervening secondary time-space-time switches and transmission media means of said plurality of primary loops to said master time control time-space-time switch.

10. The loop system of claim 9, wherein loop terminal means establish connective interfaces between said time-space-time switches and respective loops connected thereto at time distributed locations around the respective loops.

11. The loop system of claim 10, wherein a plurality of time-space-time switches are connected to each of a number of said plurality of loops; and one of said time-space-time switches of each said plurality of loops is a time signal input source for the respective loop.

12. The loop system of claim 11, wherein a loop transmission time build-out buffer for each loop is connected to the loop terminal means of the time signal input source time-space-time switch of each respective loop in the system.

13. In a digital circuit switched time-space-time equipped time division transmission loop system: a plurality of loops; a plurality of time-space-time switches; a single timing source; interconnection of said plurality of loops by said plurality of time-space-time switches in interfacing the loops as communication loops in an expanded network wherein said single timing source controls timing of the whole system; wherein said plurality of loops includes, a plurality of primary loops, and a plurality of sub loops; said plurality of time-space-time switches includes, a single master time control time-space-time switch equipped with said single timing source, and a plurality of secondary time-space-time switches connected to said master time control time-space-time switch through transmission media means of said plurality of loops; said plurality of primary loops are directly connected to said single master time control time-space-time switch; said plurality of sub loops are connected through intervening secondary time-space-time switches and transmission media means of said plurality of primary loops to said master time control time-space-time switch; loop terminal means establish connective interfaces between said time-space-time switches and respective loops connected thereto at time distributed locations around the respective loops; a plurality of time-space-time switches are connected to each of a number of said plurality of loops; one of said time-space-time switches of each of said plurality of loops is a time signal input source for the respective loop; a loop transmission time build-out buffer for each loop is connected to the loop terminal means of the time signal input source time-space-time switch of each respective loop in the system; each loop terminal means in a loop introduces k bits of delay in the loop transmission path; N is the number of loop terminal means in the loop and $T_p$ is the loop propogation delay; and, wherein the total loop delay $kN + T_p$ plus buffer time delay is exactly equal to one frame time.

14. In a digital circuit switched time-space-time equipped time division transmission loop system: a plurality of loops; a plurality of time-space-time switches; a single timing source; interconnection of said plurality of loops by said plurality of time-space-time switches in interfacing the loops as communication loops in an expanded network wherein said single timing source controls timing of the whole system; wherein said plurality of loops includes, a plurality of primary loops, and a plurality of sub loops; said plurality of time-space-time switches includes, a single master time control time-space-time switch equipped with said single timing source, and a plurality of secondary time-space-time switches connected to said master time control time-space-time switch through transmission media means of said plurality of loops; said plurality of primary loops are directly connected to said single master time control time-space-time switch; said plurality of sub loops are connected through intervening secondary time-space-time switches and transmission media means of said plurality of primary loops to said master time control time-space-time switch; loop terminal means establish connective interfaces between said time-space-time switches and respective loops connected thereto at time distributed locations around the respective loops; a plurality of time-space-time switches are connected to each of a number of said plurality of loops; one of said time-space-time switches of each of plurality of loops is a time signal input source for the respective loop; a loop transmission time build-out buffer for each loop is connected to the loop terminal means of the time signal input source time-space-time switch of each respective loop in the system; each loop terminal means in a loop introduces $k$ bits of delay in the loop transmission path: $N$ is the number of loop terminal means in the loop and $T_p$ is the loop propagation delay; and, wherein the total loop delay $kN + T_p$ plus buffer time delay is equal to an integral number of frame times and more than one appearance of each communication channel in a time frame of channels simultaneously circulate on the loop.

15. In a digital circuit switched time-space-time node equipped multi-loop telecommunications system with user terminal-to-terminal connections established prior to commencing communications; digital data time division transmission means; a plurality of time-space-time switching node means; and common timing means including a master clock source signal connected to one of said time-space-time switching node means.

16. The telecommunications system of claim 15, wherein build-out memory buffer means is connected to the time-space-time switching node means connected to said master clock source.

17. The telecommunications system of claim 15, wherein a plurality of loops, of said multi-loop telecommunications system, individually interconnect a plurality of said time-space-time switching node means; and with one build-out buffer circuit provided in each of the loops interconnecting a plurality of said time-space-time switching nodes.

* * * * *